(12) United States Patent
Deng et al.

(10) Patent No.: US 7,545,659 B2
(45) Date of Patent: Jun. 9, 2009

(54) METHOD AND APPARATUS FOR CYCLE ERROR CORRECTION FOR A POWER CONVERTER DEVICE, SUCH AS AN ELECTRONIC POWER INVERTER

(75) Inventors: Duo Deng, Canton, MI (US); Kenneth J. Farkas, Brighton, MI (US); Anil Tuladhar, Dearborn Heights, MI (US); Kerry E. Grand, Chesterfield, MI (US)

(73) Assignee: Continental Automotive Systems US, Inc., Auburn Hills ( * ) Notice: Subject to any disclaimer, the term of this patent is extended or adjusted under 35 U.S.C. 154(b) by 0 days.

(21) Appl. No.: 12/053,783

(22) Filed: Mar. 24, 2008

(65) Prior Publication Data

US 2008/0165555 A1 Jul. 10, 2008

Related U.S. Application Data

(62) Division of application No. 10/956,736, filed on Oct. 1, 2004, now Pat. No. 7,362,600.

(51) Int. Cl.
*H02J 9/04* (2006.01)
(52) U.S. Cl. .............................. 363/95; 307/87; 307/129
(58) Field of Classification Search .................. 307/87, 307/64, 73, 129; 363/95, 131, 37, 40
See application file for complete search history.

(56) References Cited

U.S. PATENT DOCUMENTS

| 5,473,533 | A | 12/1995 | Mengelt |
| 6,304,468 | B2 | 10/2001 | Ichinose et al. |
| 6,603,672 | B1 | 8/2003 | Deng et al. |
| 6,611,922 | B2 * | 8/2003 | Ozcetin et al. .............. 713/400 |
| 6,917,124 | B2 | 7/2005 | Shetler, Jr. et al. |
| 7,233,082 | B2 | 6/2007 | Furuya et al. |
| 2003/0048006 | A1 | 3/2003 | Shelter, Jr. et al. |

* cited by examiner

*Primary Examiner*—Akm E Ullah
*Assistant Examiner*—Harry Behm

(57) ABSTRACT

Cycle error correction is performed in an electronic power system to compensate for a difference between an AC grid side frequency and an AC load side frequency. The electronic power system can comprise an electronic power inverter, such as one usable with an uninterruptible power supply. Cycles of signals indicative of the AC grid power and the AC load power are counted and compared to obtain a cycle error value. If the cycle error value exceeds a first value to indicate that AC load side frequency is too high or too low, then compensation is performed to change the AC load side frequency to be closer to the AC grid side frequency. If the cycle error value falls below a second value to indicate that the AC grid side frequency and AC load side frequency are sufficiently close to one another, then the compensation is deactivated.

16 Claims, 2 Drawing Sheets

METHOD AND APPARATUS FOR CYCLE ERROR CORRECTION FOR A POWER CONVERTER DEVICE, SUCH AS AN ELECTRONIC POWER INVERTER

REFERENCE TO RELATED APPLICATION

This application is a Divisional Application of U.S. application Ser. No. 10/956,736, which was filed on Oct. 1, 2004.

TECHNICAL FIELD

The present disclosure is generally related to electric power systems, and particularly but not exclusively, relates to cycle error correction techniques for electric power systems that employ electric power converter devices, such as an electronic power inverter for an uninterruptible power supply (UPS).

BACKGROUND INFORMATION

Electric power converter systems are used to transform and/or condition electrical power in a variety of applications. For example, electrical power converter systems may transform AC power from a power grid to a form suitable for a standalone application (e.g., powering an electric motor, lights, electric heater, household or commercial equipment, telecommunications equipment, computing equipment, and so forth). Another example standalone application is an uninterruptible power supply (UPS). UPS systems have become useful as backup power supplies for hospitals, financial institutions, industrial sites, telecommunications, and the like during interruptions of a public three-phase power supply grid. Increasingly, domestic homeowners also rely on UPS systems to supplement and/or replace power from the public power supply grid during failures.

UPS systems typically incorporate some type of electrical power converter or other power transformation device/subsystem. An electrical power converter system may comprise one or more subsystems such as a DC/AC inverter, DC/DC converter, and/or AC/DC rectifier. Typically, electrical power converter systems include additional circuitry and/or programs for controlling the various subsystems, and for performing switching, filtering, noise and transient suppression, and device protection.

By way of example and historical explanation, power converter systems initially were built for specific applications. One early type of power converter was specifically designed for inverting direct current, constant voltage sources (e.g., batteries) to alternating current outputs (e.g., for operation of AC motors). Converters of this type are termed DC/AC "inverters," and they have taken the form of, for example, transformers interconnecting a DC power supply with a plurality of logic control switches to generate the necessary alternating current waveform. A rectifier is another type of power converter for converting alternating current to direct current (AC/DC). Rectifiers have proven themselves useful for adapting household 110-volt alternating current to 12-volt direct current for operation of battery-powered appliances. Devices of this type have been as simple as a step-down transformer connected to a diode bridge and a smoothing capacitor for full-wave rectification. Direct current to direct current (DC/DC) converters have been provided for conditioning direct current power from a variable power source (e.g., a wind-driven direct current motor, photovoltaic panel or the like) for charging a battery or array of batteries.

Uninterruptible power supplies have been developed that permit power to be converted from a direct current power supply to a three-phase AC load in the event of a failure of the AC grid, and for recharging the DC power supply from the AC grid through the same apparatus when the AC grid is not in a failure mode. In other implementations, a UPS system transforms AC power from the AC grid into DC power, and then transforms the DC power into AC power, which is then provided to the AC load, instead of having the AC load directly powered by the AC grid. In the event of a failure of the AC grid, such a UPS system can continue to power the AC load by obtaining DC power from an alternate source (such as a battery) and then transforming that DC power into AC power.

In many situations, the AC load needs to be provided with AC power having a frequency (e.g., cycles per second) that matches the frequency of the AC grid. One reason to match frequency is that many devices comprising the AC load or devices coupled thereto have internal clocks or other components whose timing/cycles are based on the frequency provided by the AC grid. If the frequencies do not match, then such clocks can lose significant accuracy in their timing, ranging from a loss (or gain) of several seconds to even hours over a period of time.

In implementations where an AC load is directly powered from an AC grid, such frequency matching issues are less of a concern. That is, while the AC grid frequency may vary at times, the AC grid frequency always adjusts itself to average 60 Hz, for example, and can therefore be relied upon to provide accurate cycles.

However, in implementations where the AC load is powered from a UPS rather than directly from the AC grid, the AC power provided by the UPS to the AC load may not necessarily match the AC grid frequency. In these situations, a frequency difference of 1% or greater, for example, from the AC grid frequency can cause noticeable cycle errors or other timing irregularities at the AC load. While oscillator tolerance in an internal microcontroller/microprocessor of the power inverter (or other power converter device) of the UPS can reduce cycle error, such reduction or other reliance on an internal clock of the microcontroller/microprocessor of the power inverter is not sufficient to guarantee substantially error-free cycles.

Clearly, minimum cycle error is needed by certain loads. Various institutions that rely heavily on computer data processing (such as financial institutions and telecommunication service providers) have little tolerance for significant cycle errors.

BRIEF SUMMARY OF THE INVENTION

In one aspect, a method usable in a power transformation system that can provide power from an AC source to an AC load comprises determining a frequency of a signal indicative of power supplied from the AC source. The method determines a frequency of a signal indicative of power supplied to the AC load. The method obtains an error value based on a difference between the determined AC source and AC load frequencies. The method compensates for the difference by changing the AC load frequency if the error value exceeds a first predetermined value and deactivates compensation if the error value drops below a second predetermined value.

In another aspect, a method usable in a power transformation system that can provide power from an AC source to an AC load comprises acquiring a cycle count representing a frequency of power provided to the AC load. Based on the acquired cycle count, the method determines a difference between the frequency of the power provided to the AC load and a frequency of power provided from the AC source. If the determined difference exceeds a first level, the method changes the frequency of the power provided to the AC load according to an amount based on the determined difference, until the determined difference falls below a second level.

In yet another aspect, an article of manufacture comprises a machine-readable medium usable in a power transformation system that can provide power from an AC source to an AC load. The machine-readable medium comprises instructions stored thereon that are executable by a processor to compensate for cycle error, by: determining a frequency of power supplied from the AC source; determining a frequency of power supplied to the AC load; obtaining an error value representing a difference between the determined AC source and AC load frequencies; and compensating for the difference by changing the AC load frequency if the error value exceeds a first threshold value and deactivating compensation if the error value drops below a second threshold value.

In yet a further aspect, a system in which power from an AC source can be provided to an AC load comprises means for determining a frequency of power provided to the AC load. The system comprises means for determining a difference between the frequency of the power provided to the AC load and a frequency of power provided from the AC source, and means for changing, if the determined difference exceeds a first level, the frequency of the power provided to the AC load according to an amount based on the determined difference, until the determined difference falls below a second level that is lower than the first level.

In still another aspect, an apparatus usable in a power transformation system that can provide power from an AC source to an AC load comprises a cycle counter to count cycles representative of a frequency associated with power provided to the AC load. A first component is coupled to the cycle counter to obtain a first value representative of the counted cycles and of a frequency associated with power provided from the AC source. A second component is coupled to the first component to receive the first value and to determine whether to perform frequency compensation of the power provided to the AC load based on the received first value. The second component is coupled to provide a second value indicative of whether to perform the compensation based on the received first value. A third component is coupled to the second component and coupleable to the first component to provide a third value to initiate the compensation if the second value indicates that the compensation should be performed, with the third value being based at least in part on the first value.

BRIEF DESCRIPTION OF THE SEVERAL VIEWS OF THE DRAWINGS

Non-limiting and non-exhaustive embodiments are described with reference to the following figures. In the figures, identical reference numbers identify similar elements or acts. The sizes and relative positions of elements in the figures are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the figures.

DETAILED DESCRIPTION

In the following description, certain specific details are set forth in order to provide a thorough understanding of various embodiments. However, one skilled in the art will understand that the present methods and systems may be practiced without these details. In other instances, well-known structures associated with AC or DC power supplies, inverters, and processors or controllers, or other components have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment of the present methods and systems. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

The headings provided herein are for convenience only and do not interpret the scope or meaning of the claimed invention.

As an overview, an embodiment provides cycle error correction to address situations where electronic power inverters (or other power transformation device) used in applications, such as UPS or other standalone operation, can produce large voltage cycle differences between an output for an AC load and an input from an AC power grid. Such an embodiment acquires grid and load cycle counts, and compensates the load voltage frequency to eliminate cycle error. In one embodiment, the grid and load cycles are counted using a state machine and compared to obtain a cycle error indicative of the difference between the counts. After the cycle error exceeds a first predetermined level, the load frequency is adjusted to eliminate cycle error over a predetermined amount of time. After the cycle error drops below a second predetermined level, cycle error correction/compensation is deactivated. Therefore, if the load frequency has a higher frequency than the grid frequency, cycle error correction can be performed by one embodiment to reduce the load frequency. Likewise, if the load frequency has a lower frequency than the grid frequency, cycle error correction can be performed by one embodiment to increase the load frequency.

Figure 1:
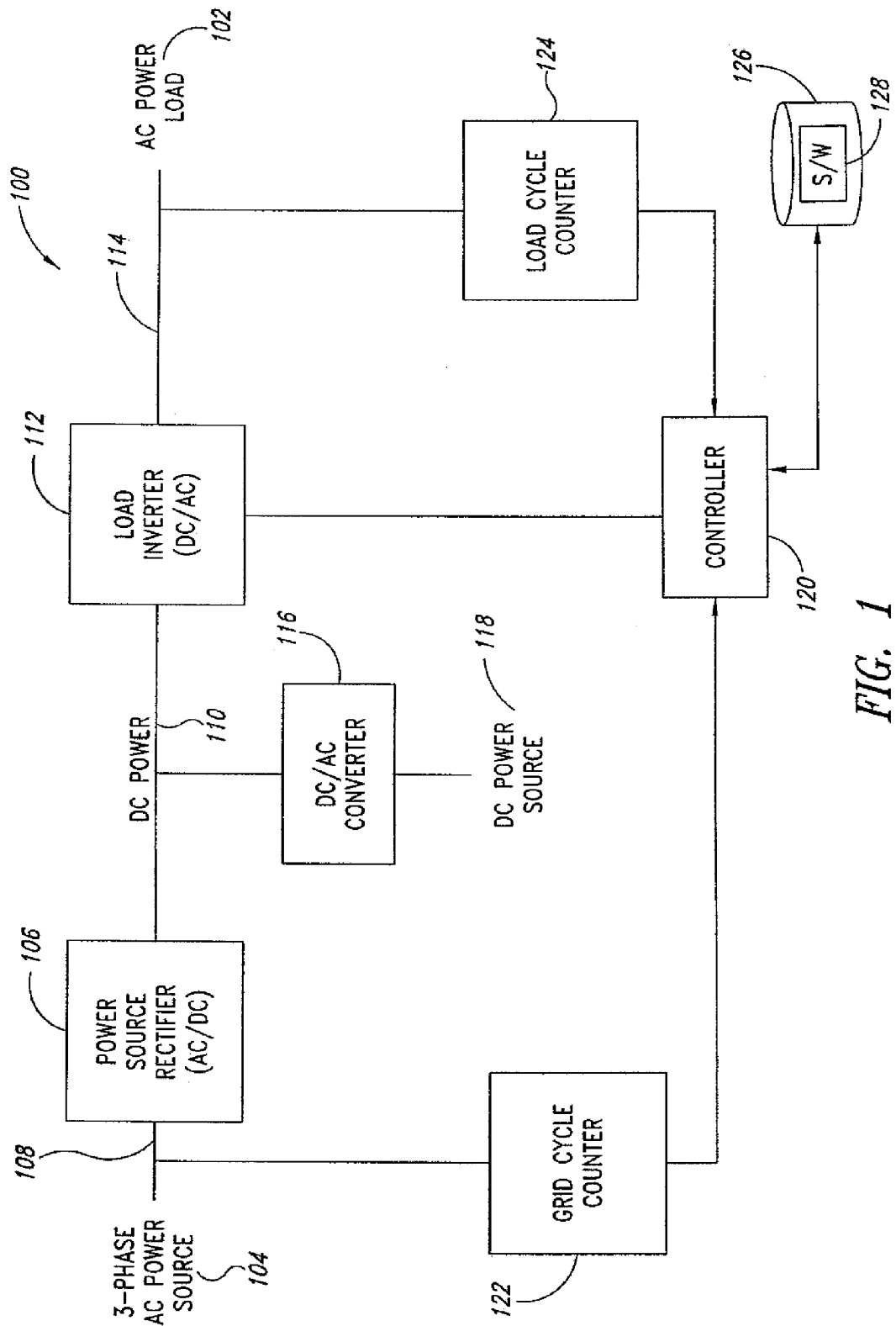
FIG. 1 is a block diagram of a system, such as a UPS system, having cycle error correction features according to an embodiment.

FIG. 1 is a block diagram of a power system 100 that can implement one embodiment of the cycle error correction technique. Simply by way of explanation and illustration herein, the system 100 will be discussed in the context of a UPS system. It is understood that embodiments can be implemented with other similar or different types of power systems and/or devices wherein a correction of a difference between a power source cycle at its input and a load cycle at its output would be useful. For example, embodiments can be used in parallel inverter applications that have an AC power grid connection.

The system 100 is useful for connecting a three-phase AC power load 102 (e.g., a hospital emergency power main, telecommunications server cluster, etc.) to a three-phase AC power source 104, for example the public power system or public AC power grid. In a UPS implementation, the system 100 comprises a plurality of components, which together operate as a power converter subsystem.

The power converter subsystem of one embodiment comprises a three-phase first converter (or power source rectifier) 106 that is coupled by way of a first AC bus 108 to receive AC power from the AC power source 104. The first converter 106 rectifies the received AC power to DC power and provides the DC power to a DC bus 110. A three-phase second converter (or load inverter) 112 is coupled by way of the DC bus 110 to the first converter 106 to receive the DC power therefrom. The second converter 112 inverts the received DC power into AC power, and provides the AC power to the AC power load 102 by way of a second AC bus 114.

In the UPS implementation, a third converter 116 (or DC/DC converter) may be coupled to the DC bus 110. The third converter 116 is coupled to a DC power source 118. The DC power source 118 can be any suitable power source, including one or more batteries, ultra-capacitors, photovoltaic cell arrays, fuel cells, and so forth. The third converter 116 operates to provide the second converter 112 with DC power in the event of a grid failure at the AC power source 104 and/or in other situations (such as a malfunction of the first converter 106) where the second converter 112 is unable to otherwise receive DC power. Alternatively or additionally, the third converter 116 can operate to supplement the DC power provided by the first converter 106. Yet further alternatively or additionally, the third converter 116 can operate to charge the DC power source 118 with DC power obtained by the first converter 106 from the AC power source 104.

A controller 120 is coupled to the second converter 112 to control operation thereof. The controller 120 can be embodied as one or more processors, microcontrollers, firmware, or other circuitry and components or combinations thereof, with or without associated memory, for example, registers, read only memory (ROM), random access memory (RAM), flash memory, and/or electrically erasable programmable read only memory (EEPROM). The illustrated embodiment depicts a single controller 120. The same or other controllers can be provided to control operation of the first converter 106, the third converter 116, or other component(s) or combination thereof of the system 100.

A power converter subsystem of the type that can be used within the system 100 of FIG. 1 is described in detail in U.S. Pat. No. 6,603,672 to Deng et al., entitled "Power Converter System," issued Aug. 5, 2003, the disclosure of which is incorporated herein by reference. It is understood that other components of the system 100 may be present. Such components include, but are not limited to, transformers, switches, capacitor banks, voltage and current sensors, and so forth. For the sake of brevity, such components are not shown or explained in detail herein.

In addition to the power converter subsystem, the system 100 of FIG. 1 comprises a grid cycle counter 122 and a load cycle counter 124. The grid cycle counter 122 is coupled to the first AC bus 108 to count or otherwise detect cycles of the AC voltage and/or current waveforms provided from the AC power source 104. The load cycle counter 124 is coupled to the second AC bus 114 to count or otherwise detect cycles of the AC voltage and/or current waveforms provided from the second converter 112 to the AC power load 102. According to one example embodiment, either or both of the cycle counters 122 and 124 can comprise zero crossing detection circuitry or other suitable hardware and/or software having the capability to detect and determine cycles/frequency of an electronic waveform. Voltage or current detectors may be used in one embodiment to detect the electronic waveforms. For the sake of brevity, detailed explanation of such cycle error counters are not provided herein, since such details would be familiar to a person skilled in the art having the benefit of this disclosure.

In one embodiment, the controller 120 is coupled to a machine-readable storage medium 126. The storage medium 126 stores software 128 or other machine-readable instructions that are executable by the controller 120. According to one embodiment, the software 128 in cooperation with the controller 120 can perform cycle error determination and compensation.

Figure 2:
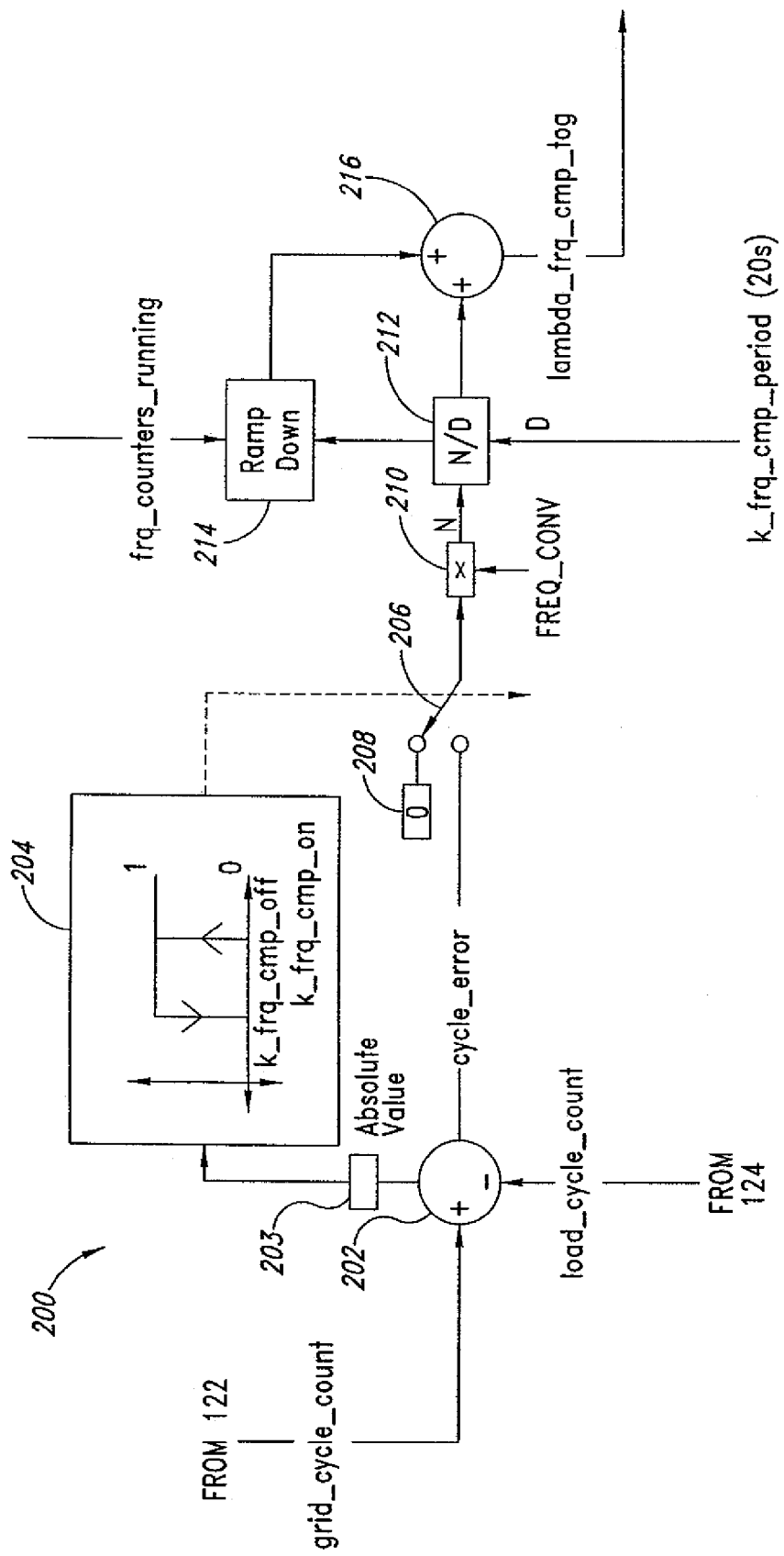
FIG. 2 is a functional block diagram of an embodiment of a cycle error correction technique for the system of FIG. 1.

FIG. 2 is a functional block diagram 200 of one embodiment of a cycle error correction technique. Hardware, software, or a combination thereof can perform the operations depicted in the block diagram 200. For instance, certain depicted operations can be performed by the software 128 in cooperation with the controller 120. In one embodiment, some elements of the block diagram 200 can comprise state machines. It is understood that the various depicted operations need not necessarily occur in the exact order shown, and that certain elements of the block diagram 200 can be added, removed, modified, combined, or any combination thereof.

The grid cycle counter 122 provides a grid_cycle_count value, and the load cycle counter 124 provides a load_cycle_count value. In one embodiment, grid_cycle_count and load_cycle_count values are provided to the controller 120. The controller 120 (or other suitable component) performs a comparison of the grid_cycle_count and load_cycle_count values at a node 202 (or other component that can perform a comparison), and obtains a cycle_error value as an output, which represents a difference between the grid_cycle_count and load_cycle_count values.

The cycle_error absolute value (from a block 203) is fed into a block 204, which compares the cycle_error value to two predetermined values K_frq_cmp_off and K_frq_cmp_on. The K_fr_cmp_off and K_frq_cmp_on values can be set by a user, and can represent values at which compensation for cycle error is to be deactivated and activated, respectively. In one embodiment, the block 204 can comprise logic and/or suitable state machines. In one embodiment, the values K_frq_cmp_off and K_frq_cmp_on comprise predetermined static values. In other embodiments, the values K_frq_cmp_off and K_frq_cmp_on can vary, can be dynamically determined, are the same or are different, or can be other types of threshold values.

In operation, if the cycle_error absolute value exceeds the K_frq_cmp_on, then this situation signifies that the load frequency is too high or too low. As a result, the block 204 outputs a binary 1 (or other signal to indicate a command to change states). The binary 1 output causes a switch 206 to close (or otherwise change states from a binary 0 depicted at a compensation-deactivation component 208).

The closing of the switch 206 causes the cycle_error value to be provided to a frequency conversion block 210. The frequency conversion block 210 performs a frequency scaling operation by which the cycle_error value is multiplied by a FREQ_CONV value.

The output of the frequency conversion block 210 is provided as a numerator value for a block 212. The block 212 performs a division of this numerator value using a K_freq_cmp_period value as a denominator value. In one example embodiment, the K_freq_cmp_period value is a predetermined period of time, such as 20 seconds. With this embodiment, the block 212 allows cycle error compensation to be performed at a gradual rate in a manner that substantially ensures that changes in cycles are subtle, and in a manner that substantially ensures that the amount of compensation is based at least in part on the cycle_error value. If the cycle error is large, then greater increments of compensation are performed over a period of time, while smaller increments of compensation are performed over a period of time if the cycle error is small. In this example, cycle error is set to be eliminated over a period of 20 seconds.

In one embodiment, the output of the block 212 is provided as an input value to a ramp down block 214 and to a summer 216. The ramp down block 214 also receives a frq_counters_running flag as an input, and provides an output value to the summer 216. The frq_counters_running flag indicates whether the compensation should be applied or not. The flag is set when the second converter 112 is connected to a load (such as the AC power load 102) and cleared when not. In one embodiment, the ramp down block 214 operates to bring the level of compensation down to substantially zero when the frq_counters_running flag indicates that the compensation should not be applied.

The summer 216 outputs a lambda_frq_cmp_tog signal, which instructs the controller 120 to change (i.e., increase or decrease) the load frequency. That is, based on the lambda_frq_cmp_tog signal, the controller 120 can control switching or other operation of the second converter 112 to change the frequency of the output AC power provided to the AC power load 102.

Returning back to the block 204, after the cycle_error value drops below the K_frq_cmp_off value (i.e., the cycle_error value is sufficiently low), compensation is deactivated. Therefore, so long as the cycle_error value exceeds the K_frq_cmp_on value, the output state of the block 204 is a binary 1, which causes the switch 206 to remain closed, thereby continuing the compensation process. However, when the cycle_error value drops below the K_frq_cmp_off value, then the output state of the block 204 changes to a binary 0, thereby causing the switch 206 to change state (e.g., open switch state at the compensation-deactivation component 208), which results in deactivation of the cycle error compensation.

In one embodiment and as depicted in the block 204 of FIG. 2, the K_frq_cmp_on and K_frq_cmp_off values are separated by a certain amount. This separation in values forms a type of hysteresis loop that prevents the block 204 from toggling output states in response to subtle changes in the cycle_error value. Accordingly, the block 204 will not toggle output states (which results in opening or closing of the switch 206) for values of the cycle_error that lie between the K_frq_cmp_on and K_frq_cmp_off values.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

For instance, the foregoing detailed description has set forth various embodiments of the devices and/or processes via the use of block diagrams, schematics, and examples. Insofar as such block diagrams, schematics and examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media. In one example embodiment described above, the cycle error correction can be performed by the software 128 stored on the machine-readable medium 126 and executable by the controller 120.

These and other modifications can be made to the present methods and systems in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. An apparatus usable in power transformation system that can provide power from an AC source to an AC load, the apparatus comprising:
    a cycle counter for counting cycles representative of a frequency associated with power provided to an AC load;
    a first component capable of obtaining a first value from said cycle counter;
    said first value being indicative of a frequency error value indicative of a difference in frequency between the AC source and AC power provided to the AC load;
    a second component capable of receiving said first value and outputting a second value, said second value being indicative of whether to perform compensation of the AC power provided to the AC load based on a first threshold value and a second threshold value;
    a third component capable of initiating compensation actions when said second value indicates compensation should occur, wherein the compensation actions include adjusting a frequency of the AC power,
    a fourth component capable of scaling said first value; and
    a fifth component capable of determining a period of time over which compensation should occur.

2. The apparatus of claim 1 wherein the second component comprises a state machine.

3. The apparatus of claim 1 further comprising a compensation-deactivation component.

4. The apparatus of claim 1 wherein at least one of the first, second, and third components comprises software code.

5. The apparatus of claim 1 further comprising a controller coupled to at least one of the first, second, or third component.

6. An apparatus usable in a power transformation system that can provide power from an AC source to an AC load, the apparatus comprising:
 a load cycle counter to count cycles representative of a frequency associated with power provided to the AC load;
 a grid cycle counter to count cycles representative of a frequency associated with power provided from the AC source;
 a first component coupled to the load cycle counter and the grid cycle counter to obtain a first value representative of a difference between the counted cycles representing the frequency associated with power provided the AC load and of the counted cycles representative of a frequency associated with power provided from the AC source;
 a second component coupled to the first component to receive the first value and to determine whether to perform frequency compensation of the power provided to the AC load based on the first value, the second component being coupled to provide a second value indicative of whether to perform the compensation based on the first value;
 said second component comprising first and second threshold levels, the second value provided by the second component indicating that compensation is to be performed if the first value is greater than the first threshold level, the second value provided by the second component indicating that compensation is not to be performed if the first value is less than the second threshold value;
 a third component coupled to the second component and coupleable to the first component to provide a third value to initiate the compensation if the second value indicates that the compensation should be performed, the third value being based at least in part on the first value;
 said third component comprising a fourth component coupleable to the first component to scale the first value to a frequency correction value; and
 a fifth component coupled to the fourth component to spread the frequency correction value over a period of time in which the compensation is to be performed.

7. The apparatus of claim 6 wherein the first value comprises an error value indicative of a difference between counted cycles associated with the power provided to the AC load and counted cycles associated with the power provided from the AC source.

8. The apparatus of claim 7 wherein at least one cycle counter comprises zero crossing detector circuitry.

9. The apparatus of claim 6 wherein the second component comprises a state machine.

10. The apparatus of claim 6, further comprising:
 a compensation-deactivation component; and
 a switch coupled to the second and third components and coupleable to at least one of the first component and the compensation-deactivation component, the switch being able to change states to couple the first component to the third component if the second value indicates that compensation is to be performed, the switch being able to change states to couple the compensation-deactivation component to the third component if the second value indicates that compensation is not to be performed.

11. The apparatus of claim 6 wherein the second value indicates that a current compensation state, at least one of active compensation and deactivated compensation, is to be maintained if the first value is between the first and second threshold levels.

12. The apparatus of claim 6 wherein at least one of the first, second, and third components comprises software code.

13. The apparatus of claim 6, further comprising a controller coupled to at least one of the first, second, and third components to control operation thereof and to perform the compensation.

14. The apparatus of claim 6 wherein the power transformation system comprises an electronic power inverter for an uninterruptible power supply.

15. The apparatus as recited in claim 6, wherein the load cycle counter counts cycles indicative of a frequency associated with power from an inverter to the AC load.

16. The apparatus as recited in claim 6, wherein the grid cycle counter counts cycles representative of a frequency associated with power provided from the AC source to an AC bus that supplies a power source rectifier.

* * * * *